US008116350B1

(12) United States Patent
Arndt et al.

(10) Patent No.: US 8,116,350 B1
(45) Date of Patent: Feb. 14, 2012

(54) ULTRAWIDEBAND ASYNCHRONOUS TRACKING SYSTEM AND METHOD

(75) Inventors: G. Dickey Arndt, Friendswood, TX (US); Phong H. Ngo, Friendswood, TX (US); Chau T. Phan, Sugar Land, TX (US); Julia A. Gross, Houston, TX (US); Jianjun Ni, Pearland, TX (US); John Dusl, Houston, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 554 days.

(21) Appl. No.: 12/353,755

(22) Filed: Jan. 14, 2009

(51) Int. Cl.
*H04B 1/00* (2006.01)

(52) U.S. Cl. ........ 375/130; 375/267; 342/126; 342/133; 342/147; 455/456.1

(58) Field of Classification Search ................. 375/130, 375/267; 342/126, 133, 147, 465; 455/456.1; 324/318, 322
See application file for complete search history.

(56) References Cited

U.S. PATENT DOCUMENTS

| | | | |
|---|---|---|---|
| 5,920,278 A | 7/1999 | Tyler et al. | |
| 6,111,536 A | 8/2000 | Richards et al. | |
| 6,133,876 A | 10/2000 | Fullerton et al. | |
| 6,300,903 B1 | 10/2001 | Richards et al. | |
| 6,483,461 B1 | 11/2002 | Matheney et al. | |
| 6,760,387 B2 | 7/2004 | Langford et al. | |
| 6,882,315 B2 | 4/2005 | Richley et al. | |
| 7,030,761 B2 | 4/2006 | Bridgelall et al. | |
| 2003/0058971 A1 | 3/2003 | Langford et al. | |
| 2003/0164794 A1 | 9/2003 | Haynes et al. | |
| 2004/0108954 A1 | 6/2004 | Richley et al. | |
| 2005/0037775 A1 | 2/2005 | Moeglein et al. | |
| 2005/0090266 A1 | 4/2005 | Sheynblat | |
| 2005/0243784 A1 | 11/2005 | Fitzgerald et al. | |
| 2006/0018295 A1 | 1/2006 | Choi et al. | |
| 2006/0046687 A1 | 3/2006 | Kwon | |
| 2006/0105776 A1 | 5/2006 | Burke | |
| 2006/0166681 A1 | 7/2006 | Lohbihler | |
| 2008/0204322 A1* | 8/2008 | Oswald et al. ................. 342/465 |

OTHER PUBLICATIONS

Ni et al., Ultra-wideband Two-Cluster Tracking System Design with Angle of Arrival Algorithm, IEEE 2006, p. 148-153.*
Dickerson et al., UWB Tracking System Design with TDOA Algorithm for Space Applications, UofH ISSO Annual Report Y2005, pp. 1-6.
Ni et al., Ultra-Wideband Two-Cluster Sytem Design wth Angle of Arrival Algorithm, IEEE 2006, p. 148-153.

* cited by examiner

*Primary Examiner* — Khanh C Tran
*Assistant Examiner* — Fitwi Hailegiorgis
(74) *Attorney, Agent, or Firm* — Theodore U. Ro

(57) ABSTRACT

A passive tracking system is provided with a plurality of ultrawideband (UWB) receivers that is asynchronous with respect to a UWB transmitter. A geometry of the tracking system may utilize a plurality of clusters with each cluster comprising a plurality of antennas. Time Difference of Arrival (TDOA) may be determined for the antennas in each cluster and utilized to determine Angle of Arrival (AOA) based on a far field assumption regarding the geometry. Parallel software communication sockets may be established with each of the plurality of UWB receivers. Transfer of waveform data may be processed by alternately receiving packets of waveform data from each UWB receiver. Cross Correlation Peak Detection (CCPD) is utilized to estimate TDOA information to reduce errors in a noisy, multipath environment.

13 Claims, 9 Drawing Sheets

ULTRAWIDEBAND ASYNCHRONOUS TRACKING SYSTEM AND METHOD

ORIGIN OF THE INVENTION

The invention described herein was made by employees of the United States Government and may be manufactured and used by or for the Government of the United States of America for governmental purposes without the payment of any royalties thereon or therefore.

BACKGROUND OF THE INVENTION

1. Field of the Invention

The present invention relates generally to passive tracking and, in one possible embodiment, relates to a two-cluster angle of arrival (AOA) tracking system wherein data from asynchronous ultrawideband (UWB) receivers are utilized to estimate time difference of arrival (TDOA) of UWB pulses utilizing a cross-correlation peak detection (CCPD) method.

2. Description of Related Art

While GPS and radar tracking systems are often very useful, GPS and radar tracking systems are not suitable or available for all tracking jobs. As one example, GPS systems are not currently available to provide long-range line of sight tracking of lunar or Mars rovers and astronauts. Other examples may include situations with a need for fine tracking accuracy but where GPS does not operate well and/or where radar systems may cause undesired emissions or interference.

Prior art AOA tracking systems use antenna arrays to extract phase information from a continuous sinusoidal signal, and then convert phase information to angle information. However, prior art AOA tracking systems have significant problems that leave them unsuitable for many tracking problems. The resolution of prior art AOA tracking systems is relatively low, which results in large tracking errors. In many prior art AOA systems and/or other prior tracking systems discussed hereinafter, synchronization between the transmitter and receivers is required, which may give rise to inaccuracies due to the synchronization error. For example, one microsecond synchronization error may linearly translate into an unacceptably 300 meter ranging error. Such systems may also cause interference with other electronic equipment and/or be affected by such interference. Moreover, such systems are likely to be adversely affected when operated in an electrically noisy, multipath environment.

The following patents show prior art efforts regarding the above and other problems:

U.S. Pat. No. 5,920,278 issued Jul. 6, 1999, to Tyler et al, discloses a broadband transmitter element, located at a remote object, which transmits a broadband signal at a prescribed transmission time. A broadband receiver element, located at a base platform spaced from the remote object, receives electromagnetic radiation during a reception search window. The broadband receiver element stores information characterizing the broadband signal. A synchronizer synchronizes the broadband transmitter element with the broadband receiver element for timing the transmission and reception. A processing device derives an estimated time of flight for the broadband signal to travel from the remote object to the base platform, and a correlation detector, located at the base platform, identifies the remote object and the arrival time of the broadband signal by correlating the stored information with signals received during the reception search window.

U.S. Pat. No. 6,760,387 issued Jul. 6, 2004, to Langford et al, and corresponding US Patent Publication No. 2003/0058971, disclose a system and method for determining angular offset of an impulse radio transmitter using an impulse radio receiver coupled to two antennas. The antennas are separated by some known distance, and, in one embodiment, one antenna is coupled to the radio with cable delay. Impulse signals from the antennas are measured to determine the time difference of arrival of one such signal received by one antenna compared to that of the other antenna. Time differential is measured by autocorrelation of the entire impulse radio scan period, by detecting the leading edges of both incoming signals or various combinations of these methods. Using a tracking receiver, the pulses may be continuously tracked thus providing real time position information.

U.S. Pat. No. 6,882,315, issued Apr. 19, 2005, to Richley et al, and corresponding US Patent Publication No. 2004/0108954, disclose an RF object locating system and method that uses or includes a set of N (N>2) receivers (monitoring stations) located at fixed positions in and/or about a region to be monitored, one or more reference transmitters that transmit a timing reference, a location processor that determines object location based on time-of-arrival measurements, and at least one object having an untethered tag transmitter that transmits RF pulses, which may additionally include object ID or other information. Free-running counters in the monitoring stations, whose phase offsets are determined relative to a reference transmitter, are frequency-lacked with a centralized reference clock. Time-of-arrival measurements made at the monitoring stations may be stored and held in a local memory until polled by the location processor. The invention permits acquisition of tag transmissions.

U.S. Pat. No. 6,111,536, issued Aug. 29, 2000, to Richards et al, discloses a system and a method for distance measurement utilizing a radio system. The distance is measured by determining the time it takes a pulse train to travel from a first radio transceiver to a second radio transceiver and then from the second radio transceiver back to the first radio transceiver. The actual measurement is a two-step process. In the first step, the distance is measured in coarse resolution, and in the second step, the distance is measured in fine resolution. A first pulse train is transmitted using a transmit time base from the first radio transceiver. The first pulse train is received at a second radio transceiver. The second radio transceiver synchronizes its time base with the first pulse train before transmitting a second pulse train back to the first radio transceiver, which then synchronizes a receive time base with the second pulse train. The time delay between the transmit time base and the receive time base can then be determined. The time delay indicates the total time of flight of the first and second pulse trains. The time delay comprises coarse and fine distance attributes. The coarse distance between the first and second radio transceivers is determined. The coarse distance represents the distance between the first and second radio transceivers in coarse resolution. An in-phase (I) signal and a quadrature (Q) signal are produced from the time delay to determine the fine distance attribute. The fine distance indicates the distance between the first and second transceivers in fine resolution. The distance between the first and second radio transceivers is then determined from the coarse distance and the fine distance attributes.

US Patent Publication No. 2006/0105776, published on May 18, 2006, by Burke, discloses an emergency service architecture for determining the location of a wireless caller. The architecture leverages a synchronization feature of GSM networks of the Base Station Subsystem (BSS) to enable employment of sparse networks by removing WLS (Wireless Location Sensor) equipment from selected cell sites. Thus, the location of a wireless caller within a sparse site can be determined. Sparse network location services can be provided further utilizing Time Difference of Arrival (TDOA) technology, and other network-based location technologies such as Enhanced Observed Time Difference (EOTD) and Angle of Arrival (AOA). Hybrid network-based/handset-based location technologies may also be used with the disclosed invention.

US Patent Publication No. 2006/0046687, published on Mar. 2, 2006, by Kwon, discloses an apparatus and a method for transmitting/receiving emergency rescue signals. In the apparatus and the method, when an emergency occurs, it is possible to provide a function capable of notifying a place at which such an emergency has occurred by means of a corresponding terminal. Accordingly, when a rescue request is accepted, a rescue center sends a rescue team to the general position of the terminal based on the GPS position information or the reporter's statement, and finds out an exact point for a corresponding terminal by means of a searching apparatus. Herein, the rescue team receives UWB signals received from the corresponding terminal of a victim at the already understood general position through the searching apparatus, and finds the victim's exact position.

An article entitled "Position Location for Indoor UWB Systems," by Yi-Ching Yeh, discloses: An indoor geolocation system for commercial, public safety, and military applications. Since most wireless communication systems used for indoor position location may suffer from dense multipath situation, which leads to a severe degradation of position accuracy. The TDOA/AOA (Time Difference of Arrival/Angle of Arrival) position location for indoor ultra-wide band (UWB) systems in the thesis uses resolution of UWB signals. In the line of sight situation, by means of increasing angle of arrival (AOA) information to time difference of arrival (TDOA) based location to achieve the goal of accurate indoor geolocation and provides non-line of sight (NLOS) error mitigation for time measurement and AOA selection to suppress the impact to position accuracy in NLOS environment. Finally, the extended Kalman filter is used to perform position tracking of the target. In the simulations, the NLOS error in time measurement is produced according to the characteristics of indoor UWB channel. Several assumptions of NLOS errors are made in angular measurement. It is observed that proposed method efficiently mitigates the position error in NLOS environment, and detects if the NLOS exists between base station and mobile station immediately.

The above approaches are limited in various ways. They utilize features that may require complex electronics and/or give rise to errors, and/or rely on satellites. For example, instead of maximizing the high timing fidelity of UWB signals, many of the above discussed prior art tracking systems reduce fidelity by requiring synchronization between transmitter and receivers, which gives rise to synchronization errors. Those of skill in the art will appreciate the present invention that addresses the above and other problems.

SUMMARY OF THE INVENTION

An object of the present invention is to provide an improved tracking system and method.

Another possible object of the present invention is to provide an improved UWB tracking system with asynchronous transmitter and receivers.

Yet another possible object of the present invention is to provide a geometry for a tracking system that utilizes a far field assumption to determine AOA information from TDOA information.

Yet another object of the present invention is to provide interface software/hardware to permit near simultaneous receipt of waveform data from multiple receivers.

Yet another possible object of the present invention is a CCPD method to improve UWB tracking accuracy in an electrically noisy, multipath environment.

Accordingly, the present invention provides a method and apparatus for tracking a position of a UWB transmitter, which produces UWB pulses. An apparatus in accord with one possible embodiment of the invention may comprise a plurality of clusters spaced apart at a cluster separation distance from each other. The invention may also comprise at least two antennas in each of the clusters, wherein the two antennas may be spaced apart from each other by an antenna separation distance. The invention may further comprise a plurality of UWB receivers operable for receiving the UWB pulses and producing UWB pulse waveform data.

Respective UWB receivers can be connected to the two antennas in each of the clusters. In one embodiment, the UWB receivers are asynchronous with respect to the UWB transmitter. Additionally, an interface with the UWB receivers collects the UWB pulse waveform data as needed by processing software/hardware to calculate the transmitter position. The computer may be programmed to utilize the UWB pulse waveform data to produce the TDOA information for the two antennas for each of the clusters. The computer may also be programmed to determine AOA information from the TDOA information for tracking the UWB transmitter.

The present invention may utilize a far field assumption to determine AOA information from the TDOA information where it is assumed that a distance of the UWB transmitter from the clusters is greater than ten times the antenna separation distance.

In another embodiment, programming and/or hardware may be utilized to interface with the UWB receivers which divide a scan of the UWB pulse waveform data into segments and to alternately receive the UWB pulse waveform data from different UWB receivers until all of the segments have been received. In one embodiment, separate software sockets may be created for each of the UWB receivers to keep data from each UWB receiver separate.

In another embodiment, the computer may be programmed to utilize peak detection on pulses in the UWB pulse waveform data to determine cross-correlation windows for the pulses. Additionally, the system may cross-correlate the UWB pulse waveform data in the cross-correlation windows, and thereby to estimate the TDOA information.

Steps of a method in accord with one possible embodiment for tracking a position may comprise providing that a plurality of UWB receivers is asynchronous with respect to the UWB transmitter, receiving the UWB pulses with the UWB receivers, and producing UWB pulse waveform data with each of the UWB receivers. Other steps may comprise interfacing with the UWB receivers for receiving the UWB pulse waveform data, and utilizing the UWB pulse waveform data for tracking the UWB transmitter.

Method steps might also comprise spacing clusters at a cluster separation distance from each other, providing a plurality of antennas in each of the clusters, and spacing the antennas at an antenna separation distance from each other. The method may comprise utilizing a far field assumption to determine the AOA information from the TDOA information, wherein it is assumed that a distance of the UWB transmitter from the clusters is ten times greater than the antenna separation distance.

The method can comprise interfacing the computer with the UWB receivers which divide a scan of the UWB pulse waveform data into segments and to alternately receive the UWB pulse waveform data from different UWB receivers until all of the segments have been received.

The method may comprise interfacing the computer with the UWB receivers by creating a separate software socket for each of the UWB receivers whereby each separate software socket receives the UWB pulse waveform data from a particular one of the UWB receivers.

The method may comprise programming the computer for detecting peaks of pulses in the UWB pulse waveform data, determining cross-correlation windows for the pulses, and estimating TDOA information by cross-correlating the UWB pulse waveform data in the cross-correlation windows.

In another embodiment, the present invention may comprise clusters of antennas spaced apart at a cluster separation distance from each other wherein the cluster antennas may be spaced apart from each other by an antenna separation distance. Processing equipment may be utilized to process waveform data produced by the receiver and produce TDOA information for each cluster. The processing equipment may then calculate a vector for each cluster from the TDOA information. The intersection of the vectors is the location of the transmitter.

DETAILED DESCRIPTION OF PREFERRED EMBODIMENTS

Figure 1:
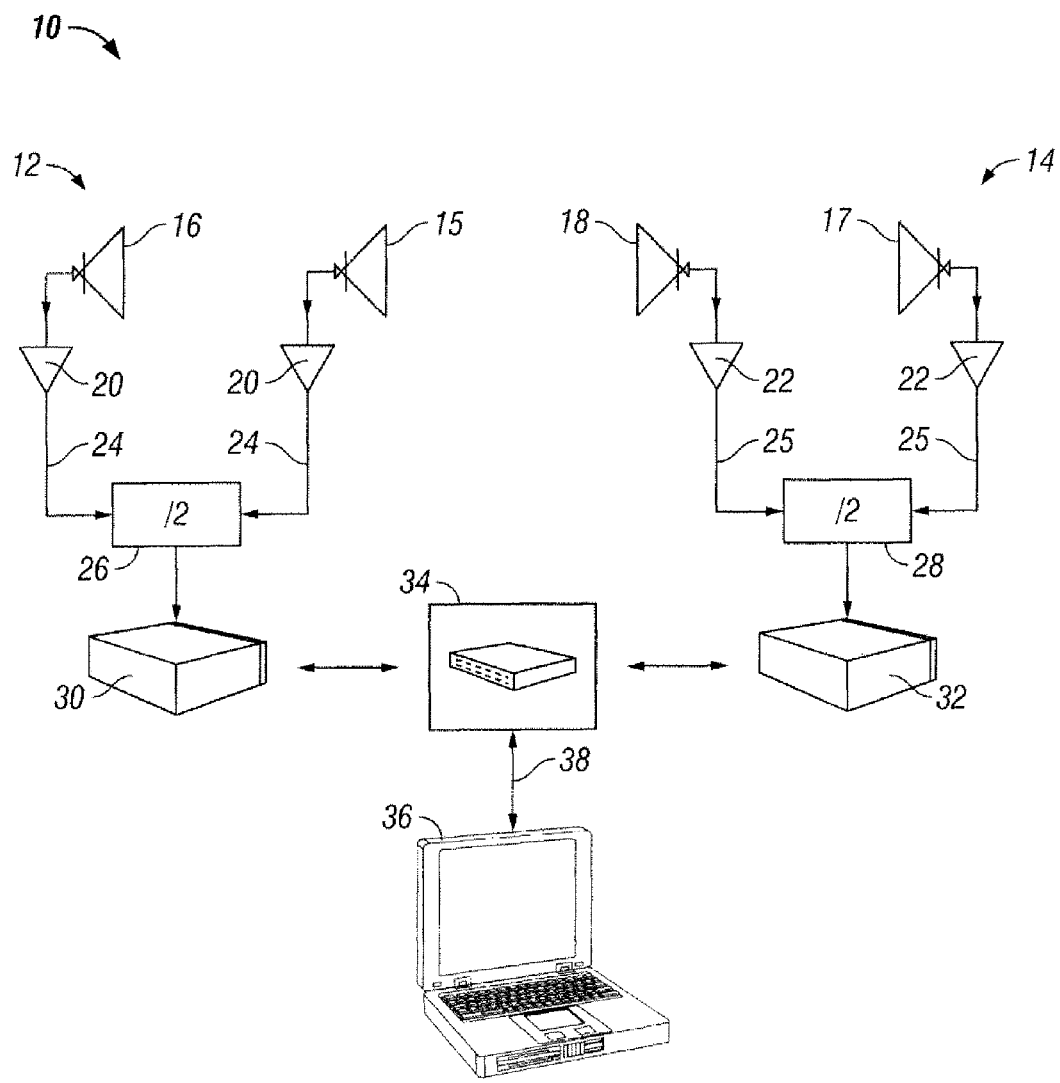
FIG. 1 is a schematic that shows a configuration for a two cluster UWB tracking system in accord with one possible embodiment of the present invention.
Figure 8:
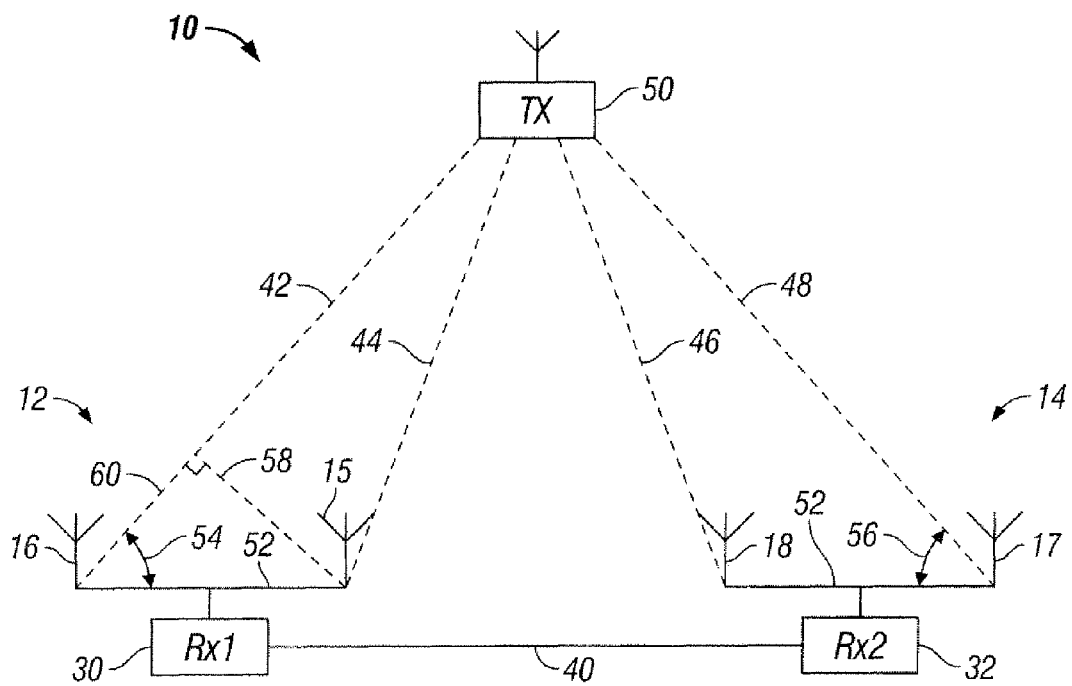
FIG. 8 is a schematic showing a geometrical representation of a UWB passive tracking system in accord with another possible embodiment of the present invention.

Referring now to the drawings and, more particularly to FIG. 1, there is shown receiver portion of UWB passive tracking system 10 in accord with one possible embodiment of the present invention. The geometric configuration of UWB passive tracking system 10 is shown in FIG. 8, wherein UWB passive tracking system 10 is operable to locate the position of moving transmitter 50 with high accuracy.

Prototype UWB Passive Tracking System Test Results

Figure 9:
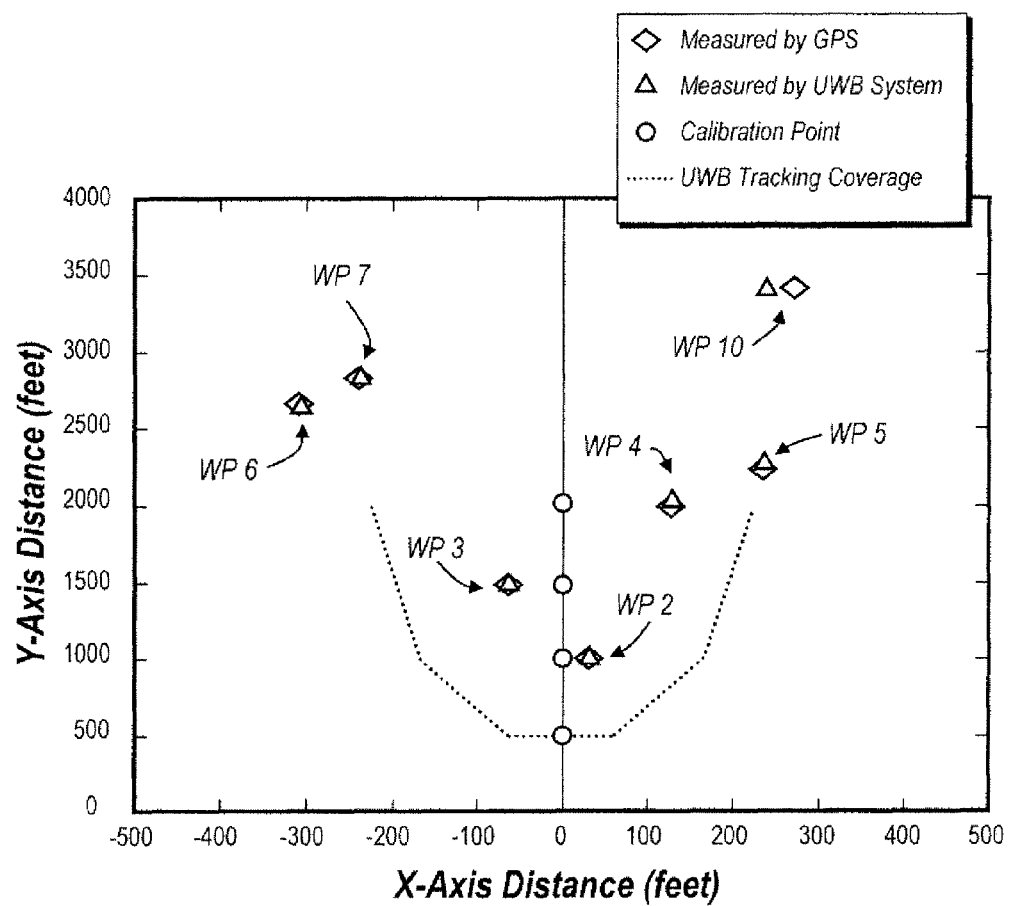
FIG. 9 is a graph showing tracking measurements of a prototype UWB passive tracking system as compared to tracking measurements utilizing a GPS system in accord with a possible embodiment of the present invention.

Results of tests of tracking accuracy of a prototype of UWB tracking system 10 are shown in FIG. 9. For this particular prototype, the estimated UWB tracking coverage is indicated by the dashed lines in FIG. 9. The symbol "WP" in FIG. 9 is a shorthand notation for a "waypoint" which indicates a test point where UWB tracking data measurement was taken. In order to evaluate the performance of the UWB tracking system, differential GPS measurement is taken at each test point as the reference of the true position. In regards to the calibration points illustrated in FIG. 9 (as indicated by circles), in order to determine the effective length of an associated cable for each antenna, calibration points were utilized. The use of cables will be discussed in more detail, infra. The effective cable length takes into account temperature and other environmental changes that affect the propagation time through a cable. The effective cable lengths are utilized in the TDOA equations to optimize accuracy. In general, it was anticipated through simulations that tracking accuracy errors at ranges up to about 2000 feet would average less than 1% of the tracking range. The tests actually showed that up to 3500 feet, the accuracy was less than 1% as compared to differential GPS measurements. For waypoint 10 (WP 10), even though the UWB measurement appears substantially different as compared to the GPS measurement, the actual tracking error is less than 0.2% of the range. The tracking update rate for the trajectory was approximately 5 Hz. This tracking update rate is adequate for the speed of movable transmitter 50, which in this embodiment, averages about 7 miles per hour. Variations of the invention, some of which are discussed herein, may result in significantly higher update rates. It is noted that the prototype system was limited to its transmission power. Additional dual power mode transmitters are available with a high power mode of +10 dB. In essence, if the transmission power can be increased, the tracking range can be increased while still retaining acceptable accuracy.

In actual testing, the inventors determined that the use of UWB pulses, in accord with the present invention, resulted in an absence of any harmful RF interference between prototype UWB passive tracking system 10 and other co-existing communication systems carried by the testbed (such as GPS at 1.6 GHz, video at 5.8 GHz, voice at 140 MHz and telemetry at 2.4 GHz). Even though some communication systems, e.g. video at 5.8 GHz, are in the UWB signal bandwidth (from 3.1 GHz to 6.3 GHz), the prototype UWB passive tracking system neither interfered with nor was affected by interference from various types of communication equipment.

General Configuration of Prototype UWB Passive Tracking System

Referring to FIG. 1 and FIG. 8, UWB passive tracking system 10 may comprise cluster 12 and cluster 14. In a particular embodiment, the clusters comprise receiver equipment to receive UWB pulses that are transmitted by moveable transmitter 50, as indicated in FIG. 8.

With continued reference to FIG. 8, in this embodiment, cluster 12 comprises receiver antennas 15 and 16. Cluster 14 comprises receiver antennas 17 and 18. While this embodiment limits the use of these antennas to receiving signals, it is contemplated that the system may incorporate multimedia communication, which may comprise two-way communication. However, the prototype of UWB passive system 10 is passive and therefore utilizes only one-way transmissions.

For testing purposes, the power output of a prototype of moveable transmitter 50 is limited to the FCC limit on the UWB emission power (−41.3 dB/Hz), so that the transmitting range is limited. It will be appreciated that the FCC limit represents a very small transmitter power output. Therefore, in order to increase the tracking range for a prototype system for testing purposes, receiver antennas 15-18 may comprise four high gain horn antennas with an antenna gain of 17 dBi. Additionally, low noise amplifiers 20 and 22 can be added after each receiving antenna. For example, low noise amplifiers 20 and 22 may have a gain of approximately 33 dB.

With particular reference to FIG. 1, interconnection cables, such as cables 24 and 25 comprise known electrical properties and may be low-loss, phase aligned cables with substantially calibrated delays. Splitters or power combiners 26 and 28 may be utilized to combine signals from each cluster of receiver antennas and provide the signals to radio receivers 30 and 32. The act of combining signals is indicated by the notation "/2" in FIG. 1 in regards to elements 26 and 28. In one embodiment, radio receivers 30 and 32 may be connected by hub 34, which then connects through cables 38 to computer 36. Interface software provides near simultaneous feed of waveform data from clusters 12 and 14 to computer 36. The interface software is represented by flow charts of FIG. 2A, 2B, 2C, and 2D. Computer 36 may comprise a processor, one or more processors or computers, or may comprise distributed processing, and/or may be built into other equipment, and/or otherwise organized to be suitable for a particular system or configuration of connections. For enhancement purposes, computer 36 may also comprise hardwired processor circuits, which are effectively programmed as desired rather than use of software programming that performs a similar function. Thus, hardware, firmware, computers, and software may be interchangeable.

Turning our attention back to FIG. 8, in the prototype embodiment, clusters 12 and 14 are 50 meters apart. The two horn antennas at each cluster are each 15 meters apart. A UWB radio is utilized as transmitter 50. The tracking range may be several thousand feet and the tracking angle of UWB passive tracking system is from 30 degrees to 150 degrees. A feature of the present geometric arrangement and operation is that there is no need in the present invention for synchronization between the transmitter and receiver, as discussed hereinafter. In other words, asynchronous transmitter and radio receivers are utilized. Thus, transmitter-receiver synchronization errors are entirely avoided. The UWB radio at each cluster is used to obtain the TDOA estimates from the UWB signal sent from the target. These two radios are also asynchronous. Utilizing interface software and making far field assumptions, the TDOA data can be converted to AOA data to find the angle of arrival. Assuming this is a long-range application, and because the distance between clusters 12 and 14 is known, the target position may then be computed, as discussed below.

In an embodiment of the present invention, UWB technology is utilized to implement UWB tracking system 10. UWB radios provide a fine time resolution on the order of picoseconds, and a low power spectral density, which allows the system to coexist with other communication systems. The present system has significant resistance to multipath interference. In a particular embodiment, such as that shown in FIG. 1, a two-cluster AOA tracking method using TDOA information is utilized for implementation of the tracking system.

UWB Radio Transmission

Ultra-wideband (UWB) is also known as impulse or carrier-free radio technology. In general, UWB is a radio technology that can be used at very low energy levels for short-range high-bandwidth communications by using a large portion of the radio spectrum. Ultra-Wideband (UWB) is a technology for transmitting information spread over a large bandwidth (>500 MHz). The Federal Communications Commission (FCC) defines UWB to describe any signal the exceeds the lesser of a bandwidth of 500 MHz or a fractional bandwidth greater than 0.2. The basic concept of current UWB technology is to develop, transmit and receive an extremely short duration burst of RF energy—typically a few tens of picoseconds to a few nanoseconds in duration. Whereas conventional continuous sine wave radio systems operate within a relatively narrow bandwidth, UWB operates across a wide range of frequencies (a few GHz) by transmitting a series of low-power impulsive signals.

With use in the present system, assuming the absence of noise, 1 nanosecond (ns) potentially provides a resolution of about 1 foot, and three picoseconds (ps) potentially represents a resolution of about 1 millimeter.

Figure 3A:
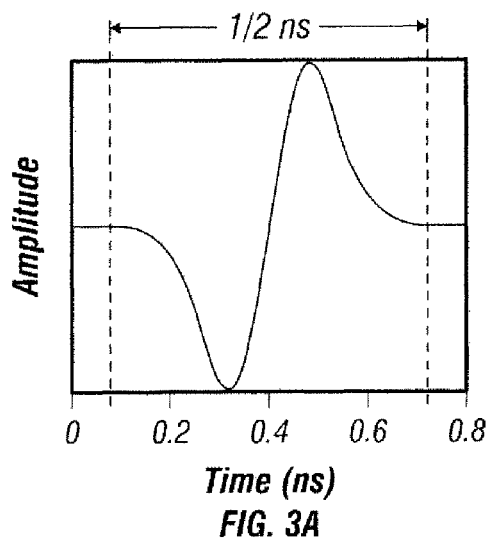
FIG. 3A is a waveform representation of a UWB pulse with respect to time in accord with one possible embodiment of the present invention.
Figure 3B:
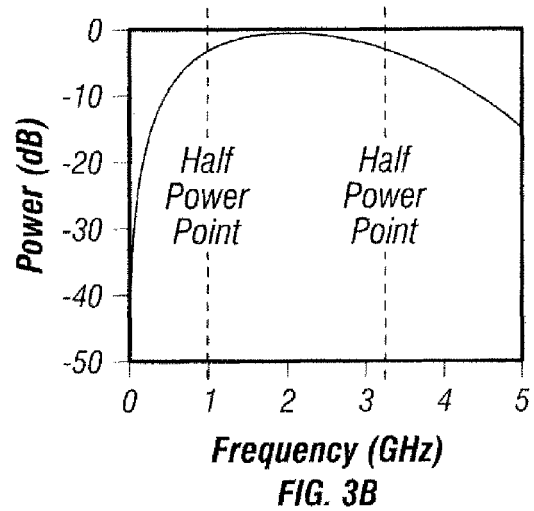
FIG. 3B is a waveform representation of a UWB pulse with respect to frequency in accord with one possible embodiment of the present invention.

The transmitted signal can be regarded as a uniform train of pulses represented as:

$$s(t) = \sum_{n=-\infty}^{+\infty} P(t - nT_r) \tag{1}$$

where $T_r$ is the pulse repetition interval, and P(t) is the pulse-shaping waveform, which is often a Gaussian monocycle. In the time domain, the Gaussian monocycle is mathematically similar to the first derivative of Gaussian function. It takes the form $$P(t) = \frac{t}{\tau} e^{-\left(\frac{t}{\tau}\right)^2} \tag{2}$$

where $\tau$ is the monocycle's duration. FIGS. 3A and 3B show an ideal monocycle centered at 2 GHz in both the time and frequency domains.

Conveying information over impulse-like radio waveform, UWB is characterized by several features:

Low-power carrier-free ultra-wide bandwidth signal transmissions;

Low impact on other RF systems due to its extremely low power spectral densities;

Immunity to interference from narrow band RF systems due to its ultra-wide bandwidth;

Multipath immunity to fading due to ample multipath diversity (RAKE receiver);

Capable of precise positioning due to fine time resolution;

Capable of high data rate, multi-channel performance; and

Low-complexity low-power baseband transceivers without intermediate frequency stage, With particular reference to FIG. 8, radio receivers 30 and 32 and moving transmitter 50 of the present invention may be built utilizing UWB chipsets and corresponding evaluation kits, which are commercially available. While for convenience in describing one-way operation of a prototype system in accord with the present invention, the terms "receiver" and "transmitter" are utilized, this is not intended to limit the use of radio receivers 30 and 32 and radio transmitter 50 only to receiving and transmitting. Due to increasing capability of UWB chipsets, it is contemplated that the signal of the present invention may also incorporate multimedia communications such as streaming video and sound, as well as high-rate data transfer, all with very low levels of power consumption. Furthermore, the present invention can also utilize array beamforming, space—time processing techniques with UWB technology to achieve long-range coverage, high capacity, and interference-free quality of reception.

Presently available chip set components can be conveniently utilized to build a UWB passive tracking system 10, which is able to achieve a high data rate, fine time resolution and low power spectral density. The AOA tracking method using TDOA information has been employed to avoid synchronization problems between the transmitter and the receiver. In this embodiment of UWB passive tracking system 10, a two-cluster system is provided with high gain horn antennas to increase the tracking range. For an expected range, simulations demonstrate that the approximation error due to a far field assumption for the AOA software, discussed hereinafter, is relatively small and the tracking scheme can achieve the desired fine tracking resolution. Interface software, discussed hereinafter, enables the semi-simultaneous data feeding from two UWB radios to MATLAB tracking software through multiple sockets. MATLAB is commercially available software and is a numerical computing environment and programming language. Outdoor tests demonstrate that the prototype UWB passive tracking system 10 can co-exist with other RF communication systems, and that a tracking resolution less than 1% of the range (wherein the range is up to at least 3500 feet, which is significantly greater than the expected range based on simulations) can be achieved. The present invention is not limited to the configuration discussed herein and may comprise a new baseline configuration, interface software, and steerable antennas to increase the tracking coverage, extension of tracking capability from 2D to 3D, and integration of the tracking system with the high speed data (voice, video and telemetry) communication system.

Interface Software

Interface software interfaces with tracking software on computer 36 with radio receivers 30 and 32 for collection of data near simultaneously through two separate sockets. The interface software collects waveform data from the radio receivers and transfers waveform data to the tracking software. In an embodiment, the data from the two UWB radios of the prototype system are taken at approximately the same time in order for the tracking software to produce an accurate position. The interface software enables accurate tracking in real time through parallel socket communication.

For the prototype of UWB passive tracking system 10 to be able to track moving transmitter 50, the tracking software, which may comprise MATLAB programming (also referred to as the "MATLAB tracking software"), may alternatively receive waveform data that are captured by radio receivers 30 and 32. Accordingly, the waveform data are transferred from the radio receivers 30 and 32 to the tracking software via the interface software, which may be written in C++ or other suitable programming language and executed on a computer. In the prototype system, the interface software allows a single computer (e.g., a personal computer [PC]) to communicate with radio receivers 30 and 32 simultaneously through two separate sockets. The interface software communicates with radio receivers 30 and 32; collects waveform data from radio receivers 30 and 32; and transfers the waveform data to the tracking software. The tracking software, which is discussed hereinafter, uses the waveform data to calculate the TDOA and AOA of the signal from moving transmitter 50.

Referring now to FIG. 2A-FIG. 2D, the interface software is divided into three sections: socket section 202; receive data section 204; and mex array section 206.

Socket section 202 creates a separate software channel or connection (socket) on a PC for each of radio receivers 30 and 32. The software sockets are used to transfer messages/data between the computer 36 and the radio receivers 30 and 32. In this embodiment, socket section 202 may use a Winsock implementation to create two User Datagram Protocol (UDP) sockets. However, the invention is not limited to a particular protocol or means for implementation.

Each socket is labeled with a unique IP address and port. Each radio receiver 30 and 32 is also labeled with a unique IP address and port. The so-created sockets are bound to the PC and can be set to a broadcast mode. A message is sent to each radio receiver telling it to begin sending data to computer 36. Each socket is checked to see if the data have arrived. If data have arrived, the program moves on to receive data section 204.

Figure 6:
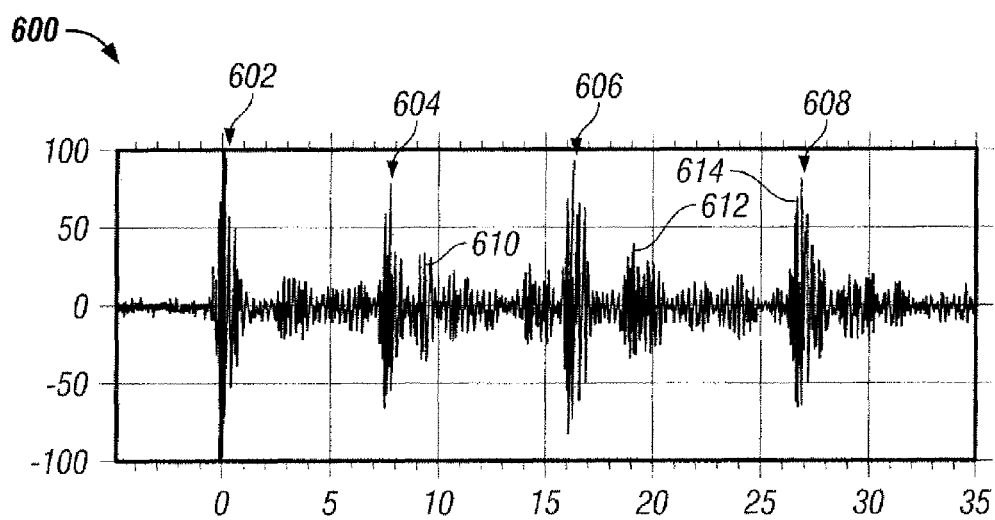
FIG. 6 is a graph showing a representation of waveform data for four received UWB pulses in accord with another possible embodiment of the present invention.

TDOA program, which is referred to at 208, utilizes waveform data, such as the waveform data shown in FIG. 6. As noted above, the tracking software may be implemented in MATLAB or other suitable software. Essentially the TDOA program can call the interface software as necessary to obtain data. In step 210, variables and structures such as buffers and the like may be created for the waveform data as indicated in step 210. Winsock may be utilized to set up sockets for each radio receiver with IP addresses and ports to which the sockets are bound, as indicated in steps 212, 214, 216, 218, 220, 222, and 224. Both sockets are set to a broadcast mode and radio receivers 30 and 32 are set to send the received waveform data as indicated at steps 226, 228, 230, and 232. The software looks for received waveform data at the sockets that have been set up as indicated at 234 and 236, whereupon when waveform data are received then receive data section 204 is utilized.

Receive data section 204 separately and near simultaneously receives segments of data from each of the two radios and assembles the segments into useful waveform data (a full representation of the received signal sent by the transmitter). In one embodiment, the sum of ninety-nine segments equals one full representation of a received signal. FIG. 6 illustrates a representation of waveform data from four antennas, as used in the prototype system of UWB passive tracking system 10.

Receive data section 204 is organized as a loop or series of loops that contains two sections, one for each receiver. The two sections operate alternately in receiving data from the respective receivers. The first part of receive data section 204 cycles through a sequence that collects a segment of data and places it into a collective buffer for the first radio. The second part of receive data section cycles through the same sequence for the second radio. The two sections of the loop are alternately repeated until each section has a complete representation of the signal. The loop is then exited and the program moves on to the mex array section 206.

Figure 2A:
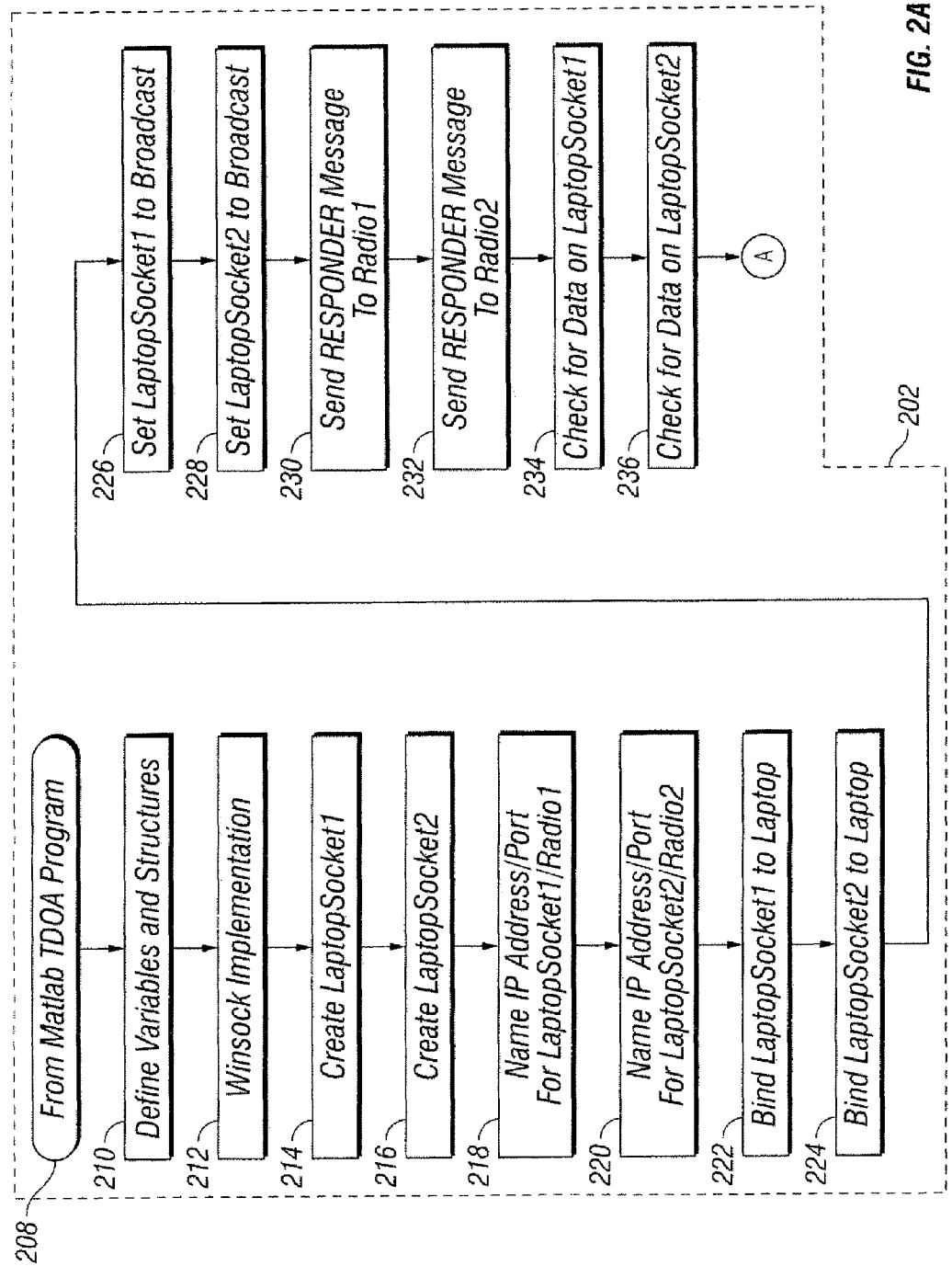
FIG. 2A is a schematic of a flow diagram for a socket section of interface software that may be utilized to allow virtually simultaneous receipt of data from asynchronous radio receivers which may be utilized in accord with at least one possible embodiment of the present invention.
Figure 2B:
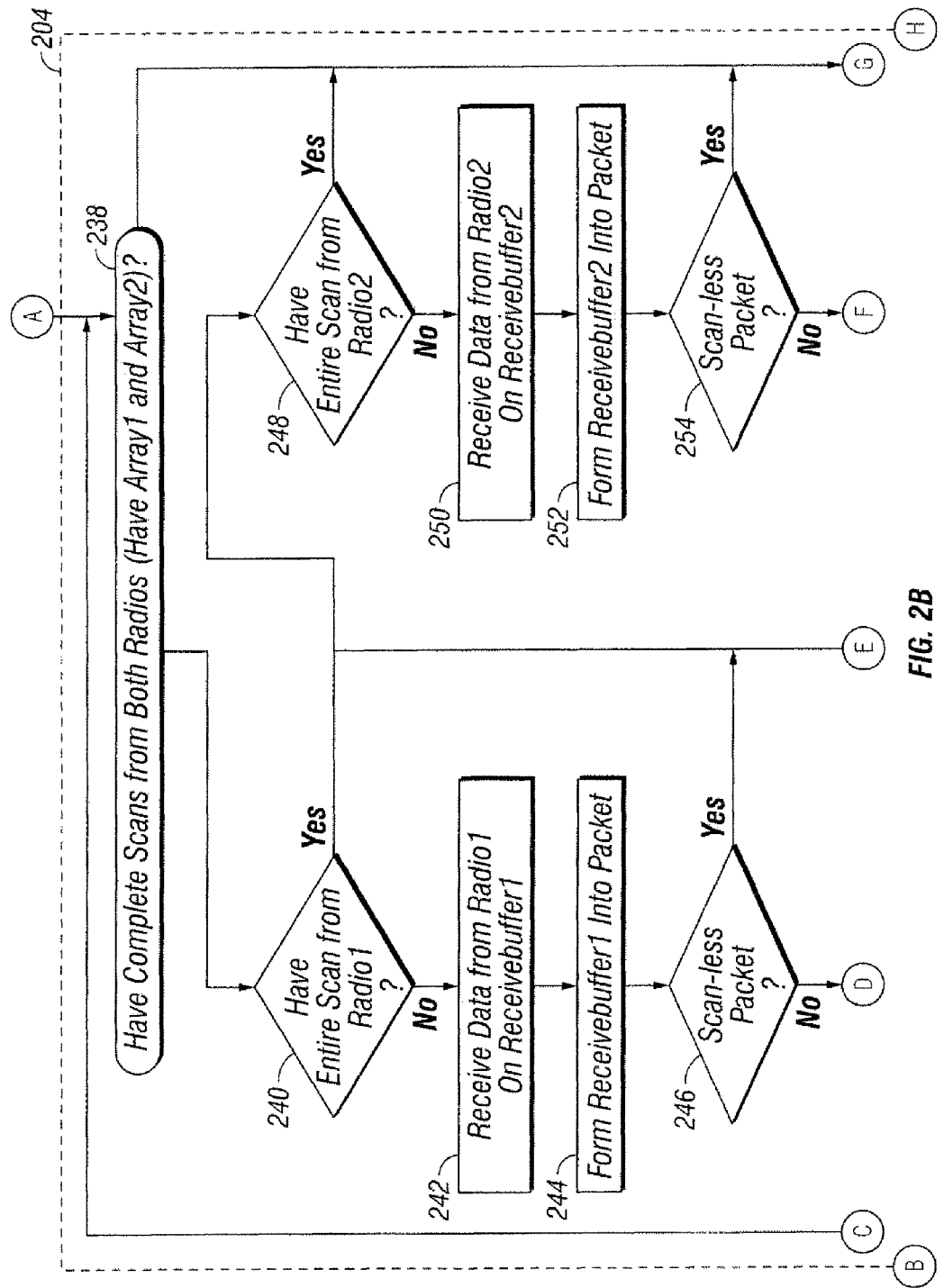
FIG. 2B is a schematic of a flow diagram for a receive data section of interface software that may be utilized to allow virtually simultaneous receipt of data from asynchronous radio receivers which may be utilized in accord with at least one possible embodiment of the present invention.
Figure 2C:
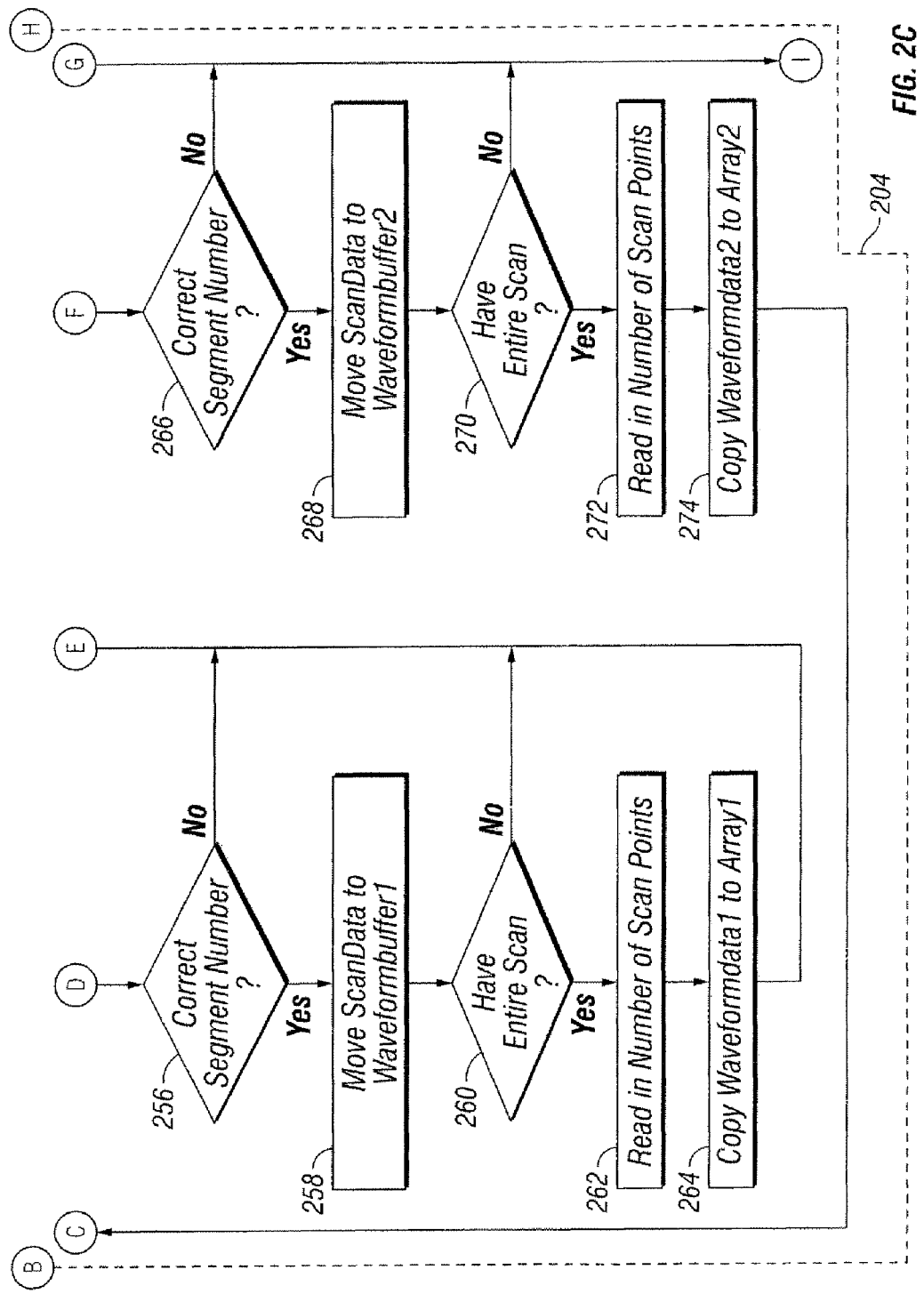
FIG. 2C is a schematic of a flow diagram which continues the receive data section of interface software shown in FIG. 2B that may be utilized to allow virtually simultaneous receipt of data from asynchronous radio receivers which may be utilized in accord with at least one possible embodiment of the present invention.
Figure 2D:
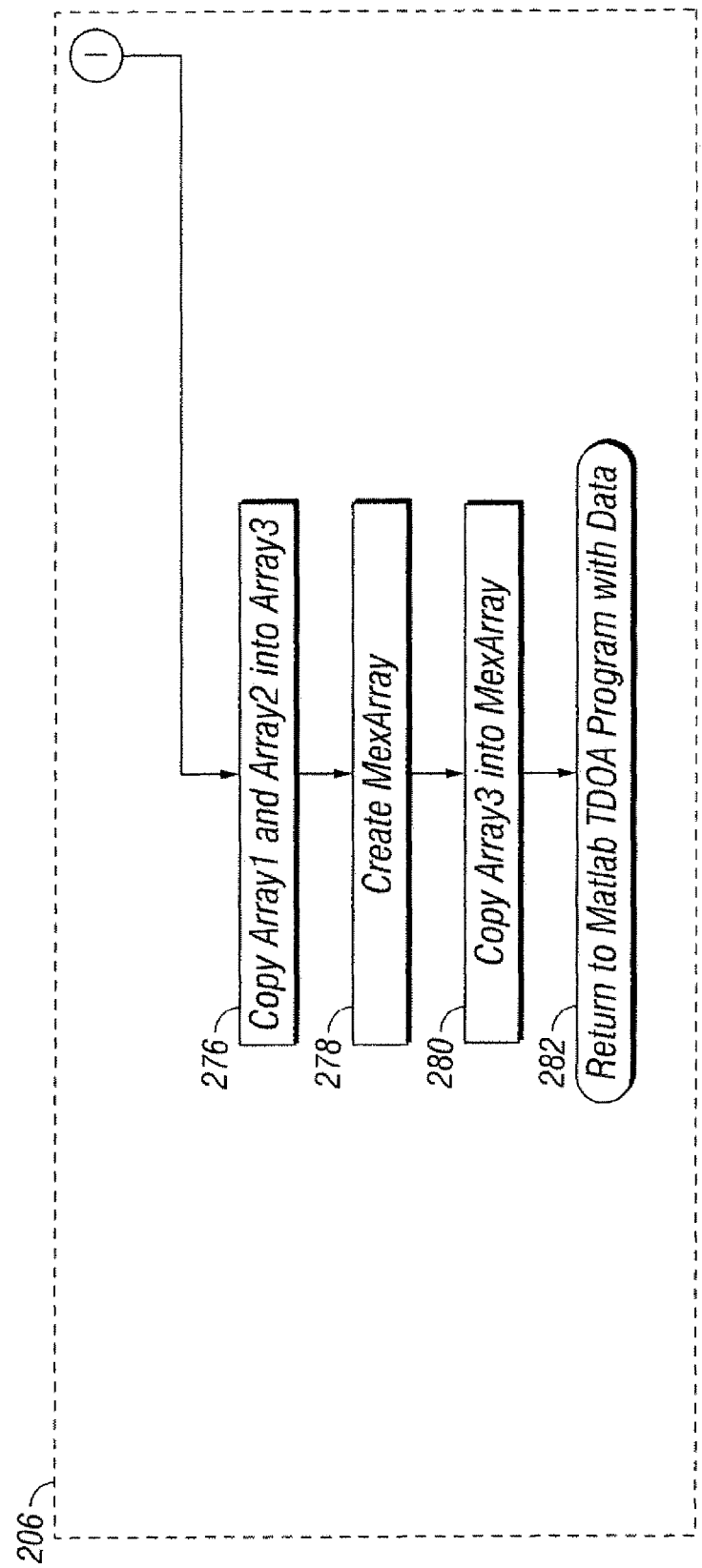
FIG. 2D is a schematic of a flow diagram for a mex array section of interface software that may be utilized to allow virtually simultaneous receipt of data from asynchronous radio receivers which may be utilized in accord with at least one possible embodiment of the present invention.

FIGS. 2B and 2C show the two sections for the two different receivers in separate columns, with steps 240 and 248 being at the top of the respective columns. One column refers to radio1, which may be radio receiver 30, and the other column refers to radio2, which may be radio receiver 32. Each of the two sections of receive section loop 204 alternately collects a segment of data on the PC from a radio and places it into waveform buffers. At each cycle, step 238 checks to see if complete scans are made for each of the arrays that are created for both radio1 and radio2. Once the scan is completed, then the arrays are transformed into a format useable by MATLAB or other suitable software in mex array section 206.

Steps 240 and 248 check to see a scan is complete for each radio receiver. If the scan is not complete, then in steps 242 and 248, waveform data are received into a respective buffer for each radio receiver. In steps 244 and 252, the buffer contents for each receiver are moved into a packet structure. Steps 246 and 254 check to see if a packet of data is complete. So long as more data are needed, the software loops back and forth between the two sections. In steps 256 and 266, the packet is checked for the correct segment number. If the packet contains information and has the correct segment number, then the portion of the packet that contains the waveform data piece is moved into a respective waveform data buffer(s) in steps 258 and 268. In steps 260 and 270, the program checks to see if a complete scan has been collected. If not, the program then collects another segment and places it into the respective buffers and the process is repeated. Once the respective waveform data buffer(s) have a complete representation of a signal, the complete waveform data buffers are copied into respective arrays.

Receive data section 204 alternates the collection of one segment of data from one radio with the collection of one segment of data from a second radio. This process allows for virtually simultaneous receiving of data from both radios without the radios being synchronized.

In an embodiment, the MATLAB tracking software has the capability to call C++ interface software as if it were a MATLAB function. MATLAB is designed to do this with a mex function. In MATLAB, a mex function takes the place of the standard MATLAB functions. In essence, this allows the MATLAB tracking software to treat the entire C++ interface program as a built-in MATLAB function.

Accordingly, the last section of the interface software is mex array 206. Mex array 206 takes the completed arrays from both sections (each radio receiver) that are created in receive data section 204 and combines them into a mex array that can be passed back into the MATLAB tracking software. Thus, in step 276, the respective arrays discussed above are copied into array 3, which is set up for this purpose. A mex array is created in step 278, and array 3 is copied into the mex array. A MATLAB program can now utilize the information in a tracking program to perform calculations discussed hereinafter.

Accordingly, the interface software generates an array that is filled with an entire waveform representation of the transmitted signal collected from each receiver as seen from approximately the same time. In an embodiment, even though this data are accessed from a single PC and a single program, the data from each radio receiver are completely separated by the use of separate sockets that are used to access the data. The sockets are set up in socket section 202. One segment of data is collected and evaluated from one receiver and then another segment of data is collected and evaluated from the other receiver in receiver data section 204. This configuration provides the separate and virtually simultaneous collection of waveform data that the MATLAB tracking software has to have in order to determine the position of moving transmitter 50.

Accessing the waveform data; assembling it in an accurate way; collecting it near simultaneously; and providing it to the tracking software are functions of the prototype UWB passive tracking system 10. In the prototype embodiment, to track moving transmitter 50, the tracking software utilizes waveform data from two separate radios such as radio receiver 30 and 32. The data are separated to avoid mixing the incoming signals from each radio. The data are taken at approximately the same time in order for the tracking software calculations to produce an accurate position. The interface software provides access to the internal waveform data from each radio. It collects the data near simultaneously from each receiver; keeps the data separate; and packages it in a way that can be passed into the MATLAB tracking software.

MATLAB has a capability to call C++ program as if it were a MATLAB function. MATLAB does this with a mex function. The mex function may be utilized to initiate the interface software to obtain data as needed, as indicated by steps 208 and 282. MATLAB treats everything within a mex function as a regular MATLAB function. Accordingly, the MATLAB tracking software is able to call the interface software to get the information it needs as indicated by step 208. Program control returns to MATLAB TDOA Program with the waveform data as indicated by step 282.

While the embodiment of the interface software discussed above is designed around MATLAB, other math programs or software/hardware may be utilized in accordance with the present invention whereby mex array section 206 would be modified accordingly. For example, implementing the MATLAB calculations in hardware circuits may greatly speed operation of the system. Socket section 202 may be modified to utilize different protocols, software and hardware. Moreover, for 3-D tracking systems, additional radio receivers may be utilized. However, it will be noted that in other embodiments the concept of operation of the interface software process by alternately retrieving waveform data separately from different radio receivers may be utilized to provide a means for collecting the data near simultaneously from each receiver, keep the data separate, and package it in a way that can be passed into the MATLAB tracking software.

AOA Tracking Program

In the present invention, an AOA approach can be applied to estimate the location of a target. This is because the approximation error under the far field assumption, as discussed subsequently, is relatively small.

FIG. 8 illustrates the geometry of the prototype two-dimensional AOA tracking case. In this embodiment, two receivers 30 and 32 are used to locate the transmitter in this 2-D space by projecting vectors and locating the intersecting point of the vectors.

In Cartesian coordinates, the analysis assumes that receiver 30 (which for analysis purposes is the center point between antennas 15 and 16) is positioned at point (0,0). It is also assumed that receiver 32 (or the center point between antennas 17 and 18) is positioned at point (d,0), where d is the separation of the clusters, baseline 40. If the angle of arrival from moving transmitter 50 to each receiver can be estimated, then two angles and a side of a triangle are known, and it can be shown that the transmitter's 2-D Cartesian coordinates can be computed using the Law of Sine as follows:

$$\left( \frac{d\cos\theta_1 \sin\theta_2}{\sin(180° - (\theta_1 + \theta_2))}, \frac{d\sin\theta_1 \sin\theta_2}{\sin(180° - (\theta_1 + \theta_2))} \right)$$

where:
$\theta_1$ is the angle from radio receiver 30 (or more specifically the center point between antennas 15 and 16) to moving transmitter 50, and
$\theta_2$ is the angle from radio receiver 32 (or more specifically the center point between antennas 17 and 18) to moving transmitter 50.

As discussed above, under the far field or long-range assumption, the distance or range to moving transmitter 50 from the receivers is assumed much greater than the cluster antenna separation distance 52. For example, in the prototype system, distance 52 is 15 meters and the range is 610 meters. Signal path lines 42 and 44 are considered substantially parallel. Likewise, signal path lines 46 and 48 are considered substantially parallel. Therefore, angle 54 is then substantially equal to B, and angle 56 is substantially equal to $\theta_2$. It is then necessary to determine angle 54 and angle 56.

This analysis assumes that the TDOA information for cluster 12 has been determined from the waveform data. In other words, the difference in time between the arrival of the signal at antennas 15 and 16 from moving transmitter is known, and is referred to hereinafter as $\tau_{12}$. Likewise, the TDOA information for cluster 14 is also known and is referred to hereinafter as $\tau_{43}$.

Because electromagnetic waves travel with constant velocity c in free space, the distance between moving transmitter 50 and each receiver is directly proportional to the propagation time of the signal. Looking at signal path 42, the distance that the signal travels along signal path 42 during the time difference of arrival of the signals at antennas 15 and 16 may be marked off on line 42. This is done by drawing line 58 from antenna 15 such that it intersects line 42 at a right angle to line 42. Then, line 60 has a length equal to $c\tau_{12}$, which is the distance that the signal travels along line 42 during time $\tau_{12}$. A corresponding line on signal path 48 in cluster 14 would have a length equal to $c\tau_{43}$. Thus, for each cluster, a right triangle has been formed wherein one side and the hypotenuse of the right triangle are known, which allows calculations of angles 54 and 56. As discussed above, under the far field assumption, angle 54 is then substantially equal to $\theta_1$ and angle 56 is substantially equal to $\theta_2$. Accordingly, taking the cosine, $$c\tau_{12} \approx a \cos \theta_1,$$

$$\theta_1 \approx \arccos(c\tau_{12}/a)$$

Similarly, $$c\tau_{43} \approx a \cos \theta_2$$

$$\theta_2 \approx \arccos(c\tau_{43}/a)$$

where a is cluster antenna separation distance 52. Accordingly, once TDOA information is obtained, AOA information can be determined to calculate a vector for each cluster, which intersects at moving transmitter 50.

In accord with the present invention, TDOA information may be utilized by software operation to obtain AOA information and determine a location of moving transmitter 50. While one embodiment of the present invention utilizes UWB pulses, the basic concept of utilizing TDOA information to create AOA information can be utilized by other tracking systems, if desired.

Cross-Correlation Peak Detection (CCPD)

In one embodiment, the present invention provides a cross-correlation-plus-peak-detection (CCPD) method for time-difference-of-arrival (TDOA) estimates of ultra-wideband (UWB) signals.

The extremely high fidelity of the UWB timing circuitry at least theoretically permits very precise measurements of propagation time. The asynchronous TDOA technique discussed above avoids introduction of any degradation of the precise time resolution, which may occur due to synchronization errors between the transmitter and receiver. As another possible feature of the invention, CCPD may be utilized to improve operation in a noisy multipath environment.

As discussed above for the prototype of UWB passive tracking system, the waveform data comprise four received UWB pulses, which may be displayed as shown in FIG. 6. In FIG. 6, each desired pulse is in one designated region of window 600. As is shown, pulse #1 is in window region [−5, 5], pulse #2 is in region [5, 15], pulse #3 is in region [15, 25], and pulse #4 is in region [25, 35]). Since the delays for interconnection cables 24 and 25 (see FIG. 1) are known precisely, TDOA is estimated using the signal processing technique CCPD described herein for the four antennas. The TDOA data are then fed into the tracking software to determine AOA information and the position of moving transmitter is computed.

With continued reference to FIG. 6, the tracking application scenario may be a noisy, multipath environment. Multipath signals can be clearly observed after pulse 604 and pulse 606 at 610 and 612, respectively. Under the line-of-sight (LOS) assumption, the desired pulse (from the direct path) has higher power than multipath signals (reflected pulses) in each segment. The first intuitive approach used is to detect the peak of each desired pulse 602, 604, 606, and 608 and estimate the TDOA. However, since one pulse has multiple peaks, such as side peak 614 around pulse 608, the main peak position may change with noise distortion. For example, in pulse 608 with random noise distortion, side peak 614 left to the main peak, may become the main peak. In this way, the TDOA estimates based on only peak detection may not be precise, and may have occasional timing errors in the order of one hundred picoseconds. As can be viewed from FIG. 5, simulation estimates suggest that a 100 picosecond error may cause an error of about 30 meters in the prototype system.

Another possible approach may be to use cross-correlation to estimate TDOA. This method may use pulse 602 as a template to cross-correlate the signals in each segment. The maximum cross-correlation coefficient between the template and the arriving signals gives the optimal estimate of the time delay between the template and the arriving signals. If it is not a multipath environment, this method achieves the optimal (in maximum-likelihood sense) TDOA estimates. However, in a multipath environment, this method can produce a large TDOA estimate error because the multipath signal may have a larger cross-correlation coefficient than the direct path signal does due to random noise when correlated with the template. For example, using this method, the multipath signal 612 after pulse 606 may have a better likelihood as the template than the desired signal pulse 606. In this case, the TDOA estimate may have an error in the level of nanoseconds, which as suggested by the graph of FIG. 5 may produce errors of several hundred meters or more.

CCPD provides a solution to the above TDOA estimation problem caused by the noisy multipath environment. The peak-detection only approach suffers the accuracy degradation due to the random noise distortion. On the other hand, the cross-correlation-only approach cannot eliminate the multipath interference. However, as per the present invention, peak-detection can identify the desired signal in a multipath environment for a LOS application and cross-correlation can provide the optimal (maximum-likelihood) estimation. Therefore, the integrated CCPD may be utilized for precise TDOA estimates. Accordingly, the CCPD method is a two-step estimation approach.

First, peak-detection in each segment is utilized to identify the desired signal (pulse from direct path), namely signals 602, 604, 606, and 608. A coarse TDOA estimation can be obtained at this step due to the random noise distortion. More importantly, this step helps distinguish the direct path signal from the multipath signals so that the cross-correlation window can be reduced from the whole segment to a pulse duration. Step one resolves the multipath interference issue.

Figure 5:
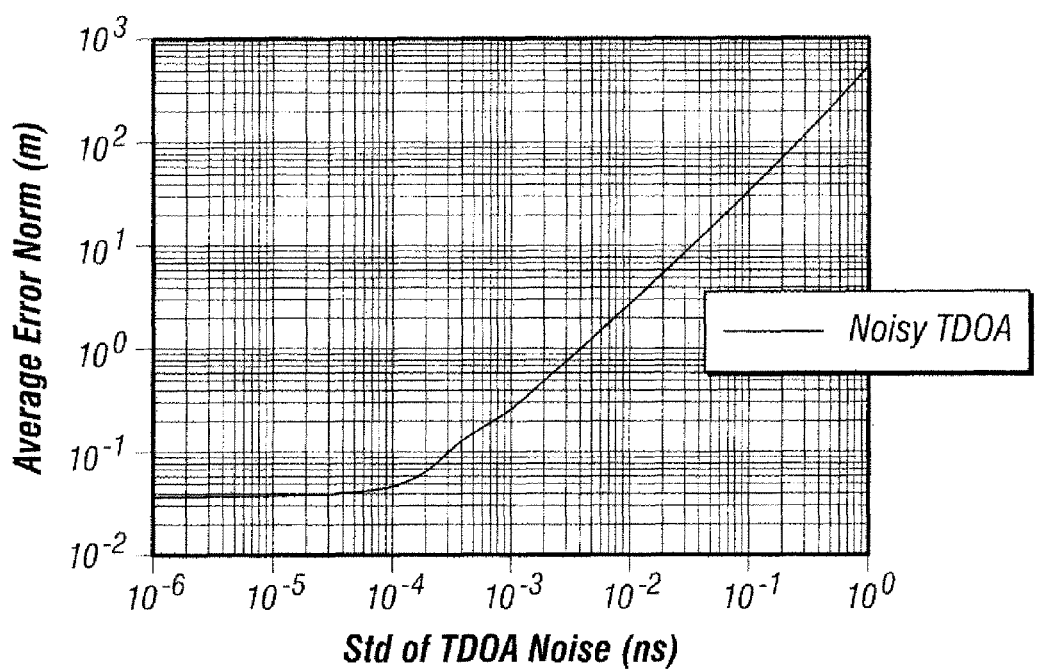
FIG. 5 is a simulation generated graph that shows accuracy of a tracking system with respect to TDOA noise levels in accord with possible embodiments of the present invention.

Once the peak of the desired signal in each segment is obtained, a cross-correlation window size can be defined as the pulse width centered at the peak position. Thus, the first pulse may be utilized as the template to correlate the desired pulse in each segment with the defined cross-correlation window, where the maximum cross-correlation coefficient indicates the optimal (maximum-likelihood) estimate of TDOA. For an embodiment for use with the prototype system, a goal was to be accurate within ten picoseconds in a practical operating environment. As shown in FIG. 5, the simulation suggests that ten picoseconds results in errors of about 3 meters at the range of 610 meters.

Figure 7:
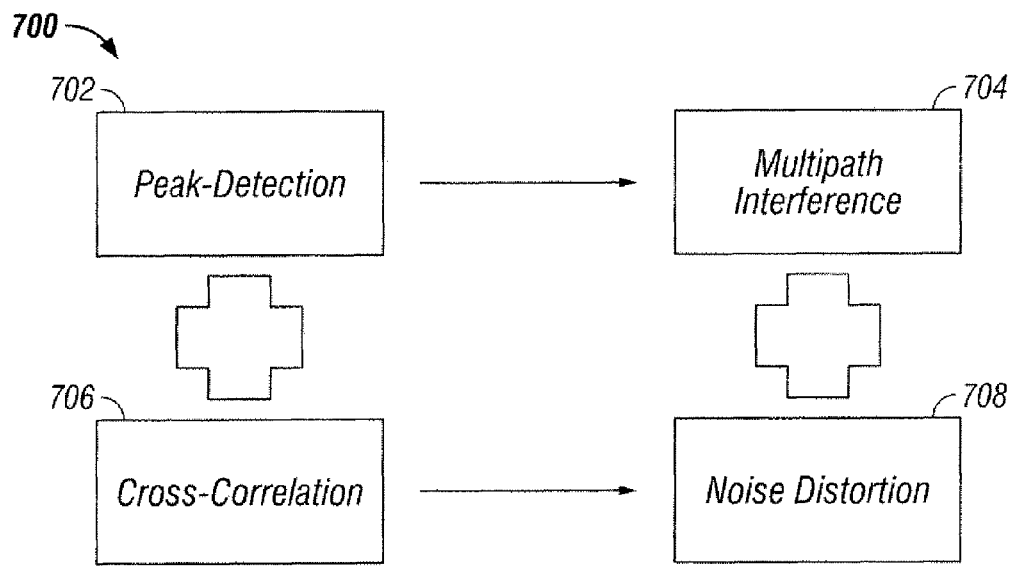
FIG. 7 is an overview of components for a CCPD system utilized to measure TDOA in accord with a possible embodiment of the present invention.

As illustrated in FIG. 7, a summary 700 of a CCPD method and problems solved is indicated. Peak detection 702 is utilized to solve problems of multipath interference 704. The random noise distortion problem 708 can be mitigated by using cross-correlation 706. The CCPD method solves both problems.

Simulation Estimations for Prototype UWB Tracking System

Figure 4:
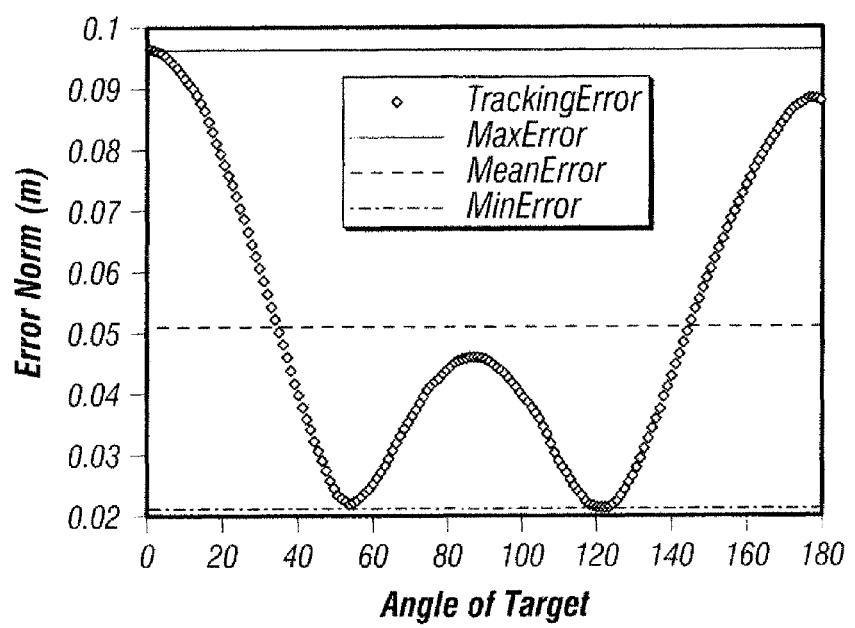
FIG. 4 is a simulation generated graph that shows accuracy of a tracking system with a selected geometry assuming perfect TDOA estimates in accord with one possible embodiment of the present invention.

Simulation results for 2-D simulations, some of which are shown in FIG. 4 and FIG. 5, reveal that the tracking resolution is a function of the TDOA estimate noise level (also referred to as timing), the baseline receiver configuration, the distance between antennas in each cluster, and the tracking range. Simulations indicated that AOA software, discussed hereinafter, achieves fine resolution. Subsequent testing of the prototype system, as discussed hereinbefore, verifies that UWB passive tracking system 10 provides an accurate tracking system that operates reliably in an electrically noisy, multipath environment.

FIG. 4 shows a plot of tracking error with respect to the angular position of receiver 50 as compared to receiving antennas 15, 16, 17, and 18, while assuming that TDOA estimates are perfect. It will be seen that the tracking error has a W-shape pattern, and that the tracking error averages about 0.05 meters and ranges from a minimum of 0.02 meters to a maximum error less than 0.1 meters. The maximum errors occur when the angle of the target, or transmitter 50, is at approximately 0 or 180 degrees with respect to the baseline 40.

For the geometry of the prototype, a tracking error occurs even assuming perfect TDOA estimates. The error arises is because a far field assumption is made to transform TDOA estimates to AOA data. It is assumed that the tracking range, or distance between radio receivers 30 and 32 and transmitter 50, is much greater than cluster antenna separation 52, which is the distance between the antennas of each cluster, as shown in FIG. 8. In other words, it is assumed that the distance to transmitter 50 is an at least ten times greater cluster antenna separation 52. Because the cluster antenna separation is 15 meters, and the tracking range is several thousand feet, this circumstance is normally true. Because of this assumption, it also follows that transmitter to receiver signal path lines 42, 44 are approximately parallel. Likewise, transmitter to receiver signal path lines 46, 48 are considered approximately parallel.

The simulation results shown in FIG. 4 assume that baseline 40 is 50 meters apart, cluster antenna separation 52 is 15 meters, and that measurements are made at a distance of 610 meters. Thus, target or transmitter 50 moves in a semi-circular orbit (from 0 degree to 180 degree) with a radius of 610 meters around clusters 12 and 14. Again, the tracking error, assuming perfect TDOA data, is less than 0.05 meters wherein the error arises due to assumptions made in the prototype system for transforming TDOA data into in the AOA process whereby 2-D vectors are projected and the target is at the intersection of the vectors.

in FIG. 5, the simulation results show that the tracking error remains less than 0.1 meter and does not appreciably change so long as the TDOA noise level is low (e.g. less than 0.1 picoseconds). However, according to the simulation, the tracking error begins to increase linearly as the TDOA noise is above 0.1 picoseconds. The simulation indicates that if the TDOA noise level is less than about 10 picoseconds, then the tracking error is less than 3.0 meters, which is less than a 1% error over the range of the field. However, the simulation also shows that noise of 100 picoseconds produces a tracking error of about 30 meters. The tracking error increases dramatically as the TDOA noise increases to picoseconds level, thereby suggesting that control of TDOA noise is important. In actual tests of a prototype system, as shown in FIG. 9, the TDOA noise level is controlled less than 10 picoseconds with the CCPD technique as indicated by the accuracy of the UWB prototype system in comparison with the GPS system. Moreover, actual tests indicate UWB passive tracking system 10 is highly stable even in an electrically noisy, multipath environment.

Assuming a random TDOA noise level with a standard deviation of 10 picoseconds, and a range of 610 meters, and variation in the angle of the target or transmitter from 30 degrees to 150 degrees, another simulation predicts an average tracking error of 21595 meters, or less than 0.5% of the tracking range.

More generally, it can be shown that the tracking error MSE (Mean Squared Error) is a function of the following parameters: cluster antenna separation distance 52, baseline 40, the distance from the antennas to moving transmitter 50 and the TDOA noise level. Several simulations were conducted to study how these parameters affect the tracking resolution. The default values of these parameters are as follows: cluster antenna separation distance 52=15 m, baseline 40=50 m, the distance to moving transmitter 50=610 meters, and the TDOA noise level is 10 picoseconds.

The relationship between the tracking error or mean squared error (MSE) and the cluster size, such as antenna separation distance 52, has been studied for (a) both perfect TDOA estimates and (b) noisy TDOA estimates. The simulation results show that the tracking error increases as the cluster size increases for perfect TDOA estimates while the tracking error decreases as the cluster size increases for noisy TDOA estimates. In both cases, increasing antenna distance 52 results in the tracking error approaching less than 1.0 meter. For 15 meters, with perfect TDOA estimates, the error is less than 0.1 meter. For noisy TDOA estimates, the tracking error is less than 3.0 meters.

The relationship between the tracking error (MSE) and the baseline size 40 has also been studied for both perfect TDOA estimates and noisy TDOA estimates. The simulation results show that the tracking error does not change as the baseline size changes for perfect TDOA estimates, and is about 0.04 meters. The tracking error decreases as the baseline size increases for noisy TDOA estimates. At 10 meters, the error is about 10 meters. At 50 meters, the error is about 3 meters. At 100 meters, the error is about 1.6 meters. Thus, changes in baseline 40 do not create significant error variations in the prototype system.

The relationship between the tracking error (MSE) and the tracking range was also studied for both perfect TDOA estimates and noisy TDOA estimates. The simulation results show that the tracking error decreases as the tracking range increases for perfect TDOA estimates. This is consistent with far field assumptions discussed hereinbefore. At 200 meters, the error is less than 0.2 meters and decreases to less than 0.02 meters at 2000 meters. On the other hand, the tracking error increases as the tracking range increases for noisy TDOA estimates. At 200 meters, the error is about 0.3 meters and increases to about 30 meters at 2000 meters.

The above simulation results show that the tracking resolution can be further improved by increasing the cluster size and the baseline size if it is feasible and by decreasing the TDOA noise level.

Accordingly, the present invention provides an AOA tracking system, which utilizes asynchronous UWB radios. Using a far field assumption, the geometry of prototype UWB passive tracking system 100 provides the angles from clusters 12 and 14 to moving transmitter 50, if TDOA data are available. TDOA data are obtained through interface software from multiple receivers in a substantially simultaneous manner. Statistical techniques can be utilized to estimate TDOA measurements in a noisy, multipath environment. The AOA system of the present invention may be made to be relatively compact and does not necessarily require antennas to be set up and interconnected to surround the area to be monitored, which may be time consuming and problematic in an environment such as Mars or the moon.

Prototype UWB passive tracking system 10 demonstrates the feasibility of utilizing UWB technology for accurate tracking. The present invention may comprise modifications to the various distances, software, hardware, UWB chipsets, and the like, to refine the resolution and refine the interface software to increase tracking update rate. Steerable antennas may be utilized to increase the tracking coverage. The geometry and above discussed features may be modified from 2D to 3D tracking. The tracking system may also be integrated with the high-speed data (voice, video and telemetry) communication system.

While the present invention is described in terms of an embodiment that may be utilized in a Martian and lunar environment, the tracking features may be utilized wherever such a system may be useful. Moreover, features of the invention described hereinbefore may be utilized to enhance other tracking systems. The present invention might be utilized in shorter ranges wherein the geometry is scaled down. The present invention may provide an accurate system, or sensor, accurate within centimeters.

A few exemplary embodiments of this invention have been described in detail above, a person skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function and step-plus-function clauses are intended to cover the structures or acts described herein as performing the recited function and not only structural equivalents, but also equivalent structures. Thus, for example, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. An ultrawideband tracking system for tracking a position of an ultrawideband transmitter that produces a plurality of ultrawideband pulses, comprising:

a plurality of clusters, said plurality of clusters being spaced apart at a predetermined cluster separation distance from each other, wherein each of said plurality clusters is comprised of:

at least two antennas, said at least two antennas being spaced apart from each other by a predetermined antenna separation distance; and at least one ultrawideband receiver operable for receiving said plurality of ultrawideband pulses and producing ultrawideband pulse waveforms data, wherein each of said at least one ultrawideband receiver is operably connected to said at least two antennas, wherein said at least one ultrawideband receiver is asynchronous with respect to said ultrawideband transmitter, and wherein said at least one ultrawideband receiver is programmed to divide a scan of said ultrawideband pulse waveform data into a pluralit of segments; and at least one computer operably connected with each of said at least one ultrawideband receiver and capable of receiving said ultrawideband pulse waveform data from each of said at least one ultrawideband receiver, wherein said at least one computer is programmed to separately and near simultaneously receive multiple streams of said plurality of segments of said ultrawideband pulse waveform data from multiple ultrawideband receivers associated with said plurality of clusters until all of said plurality of segments has been received, wherein said at least one computer is programmed to utilize said ultrawideband pulse waveform data to produce time difference of arrival information for said at least two antennas for each of said plurality of clusters, wherein said at least one computer is programmed to determine an angle of arrival information from said time difference of arrival information, and wherein said at least one computer is programmed to utilize said angle of arrival information for tracking said ultrawideband transmitter, wherein said at least one computer is programmed to interface with each of said at least one ultrawideband receiver, associated with said plurality of clusters, by creating a separate software socket for each of said at least one ultrawideband receiver whereby each separate software socket receives said ultrawideband pulse waveform data from a predetermined at least one ultrawideband receiver.

2. The ultrawideband tracking system of claim 1, wherein said at least one computer is programmed to determine said angle of arrival information from said time difference of arrival information based on a far field assumption.

3. The ultrawideband tracking system of claim 2, wherein said far field assumption comprises assuming a distance of said ultrawideband transmitter from said plurality of clusters is snore than ten times greater than said predetermined antenna separation distance.

4. The ultrawideband tracking system of claim 1, wherein said at least one computer is programmed to assemble said plurality of segments of said ultrawideband pulse waveform data from said at least one ultrawideband receiver as part of said plurality of clusters into one full representation of said ultrawideband pulse waveform data.

5. An ultrawideband tracking system for tracking a position of an ultrawideband transmitter that produces a plurality of ultrawideband pulses, comprising:
   a plurality of clusters, said plurality of clusters being spaced apart at a predetermined cluster separation distance from each other, wherein each of said plurality of clusters is comprised of:
      at east two antennas, said at least two antennas being spaced apart from each other by a predetermined antenna separation distance; and
      at least one ultrawideband receiver operable for receiving said plurality of ultrawideband pulses and producing ultrawideband pulse waveform data wherein each of said at least one ultrawideband receiver is operably connected to said at least two antennas, wherein said at least one ultrawideband receiver is asynchronous with respect to said ultrawideband transmitter, and wherein said at least one ultrawideband receiver is programmed to divide a scan of said ultrawideband pulse waveform data into a plurality of segments, and
   at least one computer operably connected with each of said
      at least one ultrawideband receiver and capable of receiving said ultrawideband pulse waveform data from each of said at least one ultrawideband receiver, wherein said at least one computer is programmed to separately and near simultaneously receive multiple streams of said plurality of segments of said ultrawideband pulse waveform data from multiple ultrawideband receivers associated with said plurality of clusters until all of said plurality of segments has been received, wherein said at least one computer is programmed to utilize said ultrawideband pulse waveform data to produce time difference of arrival information for said at least two antennas for each of said plurality of clusters, wherein said at least one computer is programmed to determine angle of arrival information from said time difference of arrival information, and wherein said at least one computer is programmed to utilize said angle of arrival information for racking said ultrawideband transmitter,
   wherein said at least one computer is programmed to alternatively receive multiple streams of said plurality of segments of said ultrawideband pulse waveform data from multiple ultrawideband receivers associated with said plurality of clusters, wherein said capability to alternatively receive multiple streams is performed by programming multiple sections, wherein said multiple sections operate to alternatively receive data from said multiple receivers until all of said plurality of segments has been received.

6. The ultrawideband tracking system of claim 5, wherein said at least one computer is programmed to utilize peak detection on said plurality of ultrawideband pulses to determine a plurality of cross-correlation windows, and wherein said at least one computer is programmed to cross-correlate said ultrawideband pulse waveform data in said plurality of cross-correlation windows thereby estimating said time difference of arrival information.

7. A method for tracking a position of an ultrawideband transmitter which produces a plurality of ultrawideband pulses, comprising:
   providing an ultrawideband tracking system comprised of:
      a plurality of clusters, said plurality of clusters being spaced apart at a predetermined cluster separation distance from each other, wherein each of said plurality of clusters is comprised of:
         at least two antennas said at least two antennas being spaced a art from each other by a predetermined antenna separation distance;
         at least one ultrawideband receiver capable of receiving said plurality of ultrawideband pulses and capable of producing ultrawideband pulse waveform data, wherein each of said at least one ultrawideband receiver is operably connected to said at least two antennas, and wherein said at least one ultrawideband receiver is asynchronous with respect to said ultrawideband transmitter; and
      at least one computer capable of interfacing with said at least one ultrawideband receiver and capable of receiving said ultrawideband pulse waveform data;
   receiving said plurality of ultrawideband pulses by said at least one ultrawideband receiver associated with said plurality of clusters;
   producing a plurality of ultrawideband pulse waveform data sets b said at least one ultrawideband receiver associated with said plurality of clusters;
   interfacing said at least one computer with said at least one ultrawideband receiver associated with said plurality of clusters, wherein said step of interfacing is comprised of:
      creating a separate software socket for each of said at least one ultrawideband receiver, wherein each separate software socket receives said ultrawideband pulse waveform data from, a predetermined at least one ultrawideband receiver;
   scanning each of said plurality of ultrawideband pulse waveform data sets, wherein said step of scanning is performed by said at least one computer and is comprised of:
      dividing a scan of each of said plurality of ultrawideband pulse waveform data sets into a plurality of segments; and
      alternately receiving said plurality of ultrawideband pulse waveform data sets until all of said plurality of segments from all plurality of ultrawideband pulse waveform data sets has been received by said at least one computer; and
   programming said at least one computer to utilize said plurality of ultrawideband pulse waveform data sets for tracking said ultrawideband transmitter, wherein said step of programming is comprised of:
      utilizing said ultrawideband pulse waveform data to produce time difference of arrival information for said at least two antennas for each of said plurality of clusters;
      determining angle of arrival information from said time difference of arrival information; and
      utilizing said angle of arrival information for tracking said ultrawideband transmitter.

8. The method of claim 7, further comprising the step of:
programming said at least one computer to determine said angle of arrival information from said time difference of arrival information through the use of a far field assumption.

9. The method of claim 8, wherein the far field assumption comprises assuming that a distance of said ultrawideband transmitter from said plurality of clusters is more than ten times greater than said predetermined antenna separation distance.

10. The method of claim 7, wherein the step of programming is further comprised of:
detecting peaks of a plurality of pulses in said ultrawideband pulse waveform data;
determining a plurality of cross-correlation windows for said plurality of pulses; and
estimating time difference of arrival information by cross-correlating said ultrawideband pulse waveform data in said plurality of cross-correlation windows.

11. An ultrawideband tracking system for tracking a position of an ultrawideband transmitter which produces ultrawideband pulses, comprising:
a plurality of ultrawideband receivers operable for receiving said ultrawideband pulses and producing ultrawideband pulse waveform data;
at least one computer programmed to interface with said plurality of ultrawideband receivers and receive said ultrawideband else waveform data, wherein said at least one computer is programmed to utilize peak detection on said plurality of pulses in said ultrawideband pulse waveform data to determine a plurality of cross-correlation windows for said plurality of pulses, wherein said at least one computer is programmed to cross-correlate said ultrawideband pulse waveform data in said plurality of cross-correlation windows, and wherein said at least one computer estimates time difference of arrival information for use in tracking the position of said ultrawideband transmitter, wherein said at least one computer is programmed to interface with said plurality of ultrawideband receivers which divide a scan of said ultrawideband pulse waveform data into a plurality of segments and to alternately receive said ultrawideband pulse waveform data from different ones of said plurality of ultrawideband receivers until all of said plurality of segments has been received; and
a plurality of at least two antennas operably connected to each of said plurality of ultrawideband receivers, wherein said at least two antennas being spaced apart from each other by an antenna separation distance, wherein said at least one computer is programmed to utilize said ultrawideband pulse waveform data to produce said time difference of arrival information for said at least two antennas for each of said plurality of receivers, wherein said at least one computer is programmed to determine angle of arrival information from said time difference of arrival information based on a far field assumption that a distance of said ultrawideband transmitter from said plurality of clusters is more than ten times greater than said antenna separation distance, and wherein said at least one computer is programmed to utilize said angle of arrival information for tracking said ultrawideband transmitter.

12. The ultrawideband tracking system of claim 11, wherein said plurality of ultrawideband receivers is asynchronous with respect to said ultrawideband transmitter.

13. The ultrawideband tracking system of claim 11, wherein said at least one computer is programmed to interface with said plurality of ultrawideband receivers by creating a separate software socket for each of said plurality of ultrawideband receivers whereby each separate software socket receives said ultrawideband pulse waveform data from a particular one of said plurality of ultrawideband receivers.

* * * * *